Nov. 3, 1942.    C. E. BOOKIDIS    2,300,396
NUT ROLLING AND SHAPING MACHINE
Filed Feb. 24, 1940    3 Sheets-Sheet 2

INVENTOR.
C. E. BOOKIDIS
BY
ATTORNEY

Patented Nov. 3, 1942

2,300,396

UNITED STATES PATENT OFFICE 2,300,396

NUT ROLLING AND SHAPING MACHINE

Charles E. Bookidis, Davenport, Iowa

Application February 24, 1940, Serial No. 320,593

15 Claims. (Cl. 107—1)

This invention relates to the art of making candy bars and has particular reference to a machine for rolling of bars in nuts during their manufacture and the shaping of the rolled bars.

It has been well known and recognized in the candy bar industry prior to this invention that dipped bars which are then rolled in peanuts are defective when made in the known machines. Very expensive and elaborate machines have been employed to dip, roll, and shape the bars, but none of them have been able to produce a product of sufficient regularity as to size and shape to be suitable for machine wrapping. This lack of regularity has a substantial effect upon the sales of machine-made bars, because there will be great variation in the amount of caramel upon the various bars, and because in many cases there will be caramel on one side only of the center and therefore nuts on one side only. Even the merest novice will know that such a bar is defective and even the most rigid control of the grade of materials entering the product is insufficient to overcome the adverse effects numbers of defective bars. Also, prior nut-rolling and shaping machines have produced a considerable quantity of waste material in the form of small pieces, too large to be returned to the nut supply and yet not salable as bars in any sense. Such scrap has found a market as stock feed, resulting in a substantial loss to the candy manufacturer.

The machine provided in accordance with this invention has for its object to overcome the above described shortcomings of prior rolling and shaping machines. Machines in accordance with the present invention have been found to produce a uniform product which is regular in size and shape, whereby it can be machine wrapped, which is uniform between bars in the amount of material, and which is uniform about the center of a single bar, all sides receiving an even coating of both caramel and nuts.

In accordance with this invention, a machine is provided which has a conveyor belt upon which there is first deposited a bed of nuts or the equivalent such as cocoanut. A candy center is then deposited upon the bed of nuts, the center carrying a plastic coating, such as caramel. More nuts are placed on the belt across the width thereof continuously to coat the top surfaces of the centers carried by the belt. The belt, after carrying the bed of nuts and centers for a short distance, is deflected downwardly, there being provided a second conveyor to receive the nuts and centers below the point of deflection. The upper surface of the second conveyor is driven in the opposite direction from the upper surface of the first conveyor whereby the bars are turned over and nuts are pressed into the side which was at first uppermost.

I have further provided improved means in the present invention for the shaping of the bars so rolled. By this shaping the nuts are more securely attached to the bar.

This invention is illustrated in the accompanying drawings which show an illustrative embodiment thereof and in which:

Fig. 5 is a fragmentary vertical section through one of the nut distributors.

Figure 2:
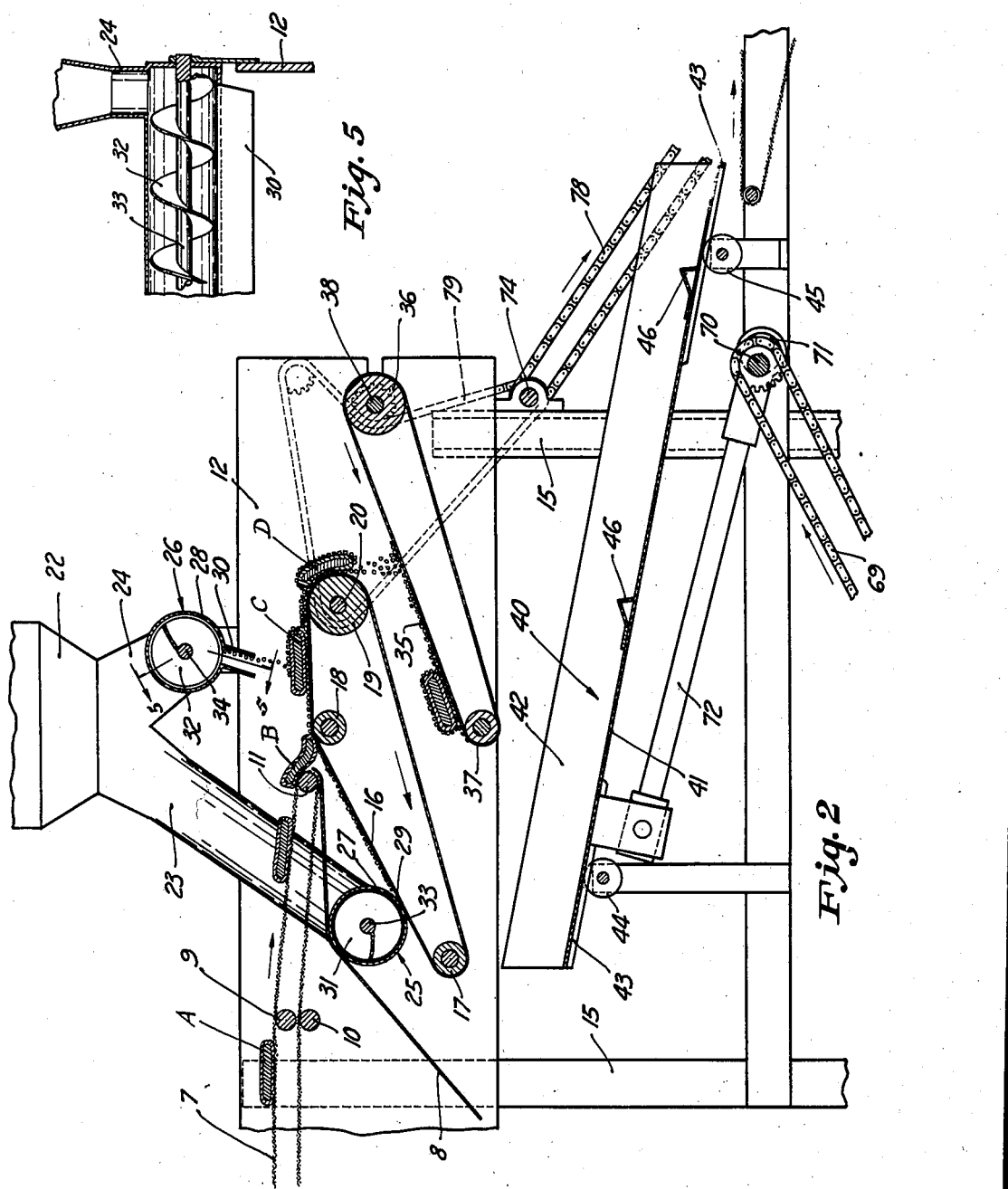
Fig. 2 is a longitudinal section of the machine shown in Fig. 1.
Figure 3:
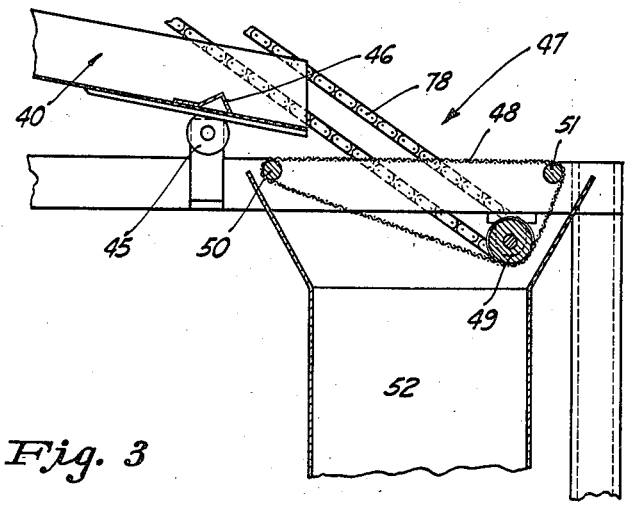
Fig. 3 is a longitudinal section through the nut sifter, this section being a continuation of Fig. 2.
Figure 6:
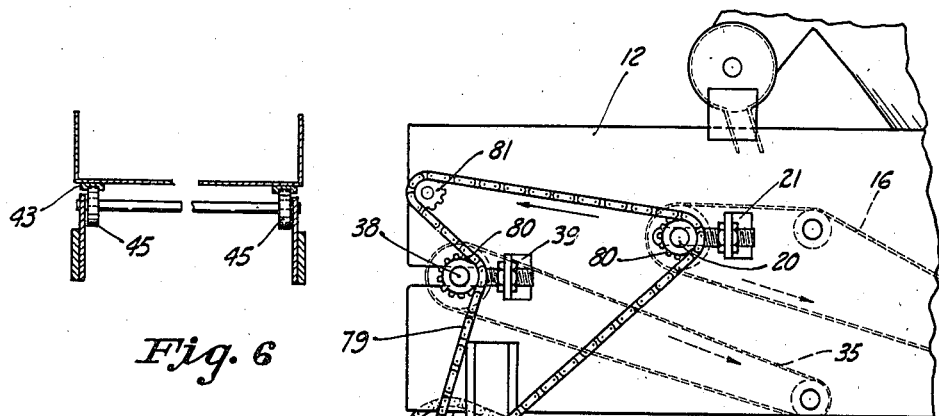
Fig. 6 is a broken transverse section of the shaper table.
Figure 4:
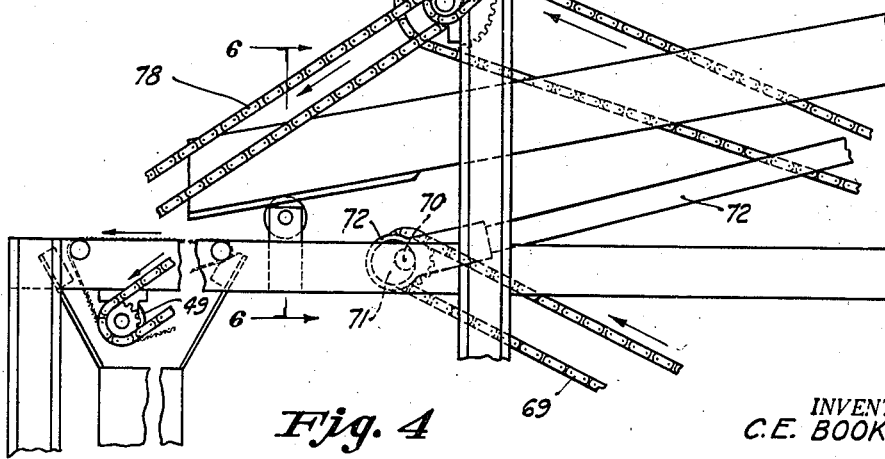
Fig. 4 is a fragmentary, broken, side elevation of the side opposite that shown in Fig. 1.

Referring now more particularly to Fig. 2, the link conveyor 7 may be the conventional link conveyor of a conventional enrobbing machine, such as one in which the material with which the centers are to be coated is poured upon the centers continuously as the centers are carried along the conveyor. A drip pan 8 is provided below the conveyor 7 to return to the enrobber any of the coating which drips off of the centers.

While this invention has special reference and application to the use of caramel coated centers for nut rolling, any other edible plastic material may be used to coat the centers to which the nuts, or the like, may adhere. Also, it is to be noted that while I have used in this description and in the appended claims the term "nuts," it should be understood that this term is here used in a broad sense to indicate particles of any material with which the plastic coated centers may desirably be covered.

The upper run of the enrobber conveyor 7 is supported by a roller 9 and the lower run by a roller 10. The delivery end of the conveyor 7 passes around a roller 11. Each of the rollers 9, 10, and 11 is idly supported in the side frame plates 12 and 14 of the roller. These frame plates are in turn supported by the legs 15, of which there are four provided, and between which there is provided suitable cross bracing (not shown).

A conveyor belt 16 is supported by rollers which are mounted in the plates 12 and 14. The idle roller 17 supporting the belt 16, is located below the drip pan 8, spaced a substantial distance both below and in a horizontal direction from the roller 11. A second idle roller 18 is positioned in proximity to the roller 11 but on the other side thereof and at an elevation to hold the belt 16 close to the roller 11 so as to receive coated centers directly from the conveyor 7. A third roller 19 is carried for driving in the frame plates 12 and 14 and is positioned to support the belt 16 at a point more distant from the roller 11 than the roller 18. This roller 19 has a shaft 20, extending therethrough, the ends of which are carried by belt tighteners 21 of conventional construction.

A hopper 22 for nuts is positioned above the nut-rolling mechanism and is provided with a pair of chutes 23, 24 which deliver nuts to each of two distributor assemblies 25, 26. The distributor assembly 25 is positioned between the drip pan 8 and the run of belt 16 between the rollers 17 and 18, while the other distributor 26 is positioned above the run of belt 16 which is between the rollers 18 and 19. Each of the distributor assemblies 25, 26 is provided with a tubular shell 27, 28 extending between the frame plates 12, 14, which shells are each provided with a longitudinal slot 29, 30, lengthwise of the lower surface. The distributors are each provided with a screw conveyor 31, 32 carried by a shaft 33, 34, the screw conveyors moving the nuts from the ends of the distributors at which the chutes 23, 24 are located along the length of the distributors so that the nuts fall out of the slots 29, 30 substantially all along the distributors, and thereby each distributor deposits a bed of nuts on the belt 16.

A second conveyor belt 35 is carried for driving by a pair of rollers 36, 37, the belt being arranged below the roller 19 to receive coated centers from belt 16. The roller 36 is carried by a shaft 38 extending therethrough, and a conventional belt tightener 39 is used to support each end of the shaft. The upper run of belt 35 moves in the direction of the belt 16 and is inclined downwardly in that direction, so that centers coming from belt 16 onto belt 35 are turned end-for-end and therefore the other side up.

A shaper table 40 is located in an inclined position below the belt 35, and so located as to receive coated centers therefrom. The table is provided with a bottom 41, side rails 42, and with four longitudinally slotted guides 43, one at each corner of the table. A pair of rollers 44 engage in the guides 43 at the upper end of the table, and a second pair of rollers 45, located at a lower level than rollers 44, engage in the guides 43 at the lower end of the table. Transverse obstructions 46 extend across the table bottom 41 and, as shown, are of double ramp shape. These obstructions over which the bars must travel serve to roll the bars over as they work their way down the table.

A nut sifter 47 is located at the outlet end of table 40, and is provided with an endless sifting belt 48 carried by drive roll 49 and idle rolls 50, 51, and with a nut receiver 52 to catch the nuts from the sifting belt. The rolled and shaped bars are carried across the sifting belt 48 and are discharged at the outlet end thereof.

I have above described the operative parts of the illustrative machine embodying this invention and shall now describe a drive mechanism suitable for operating it.

Figure 1:
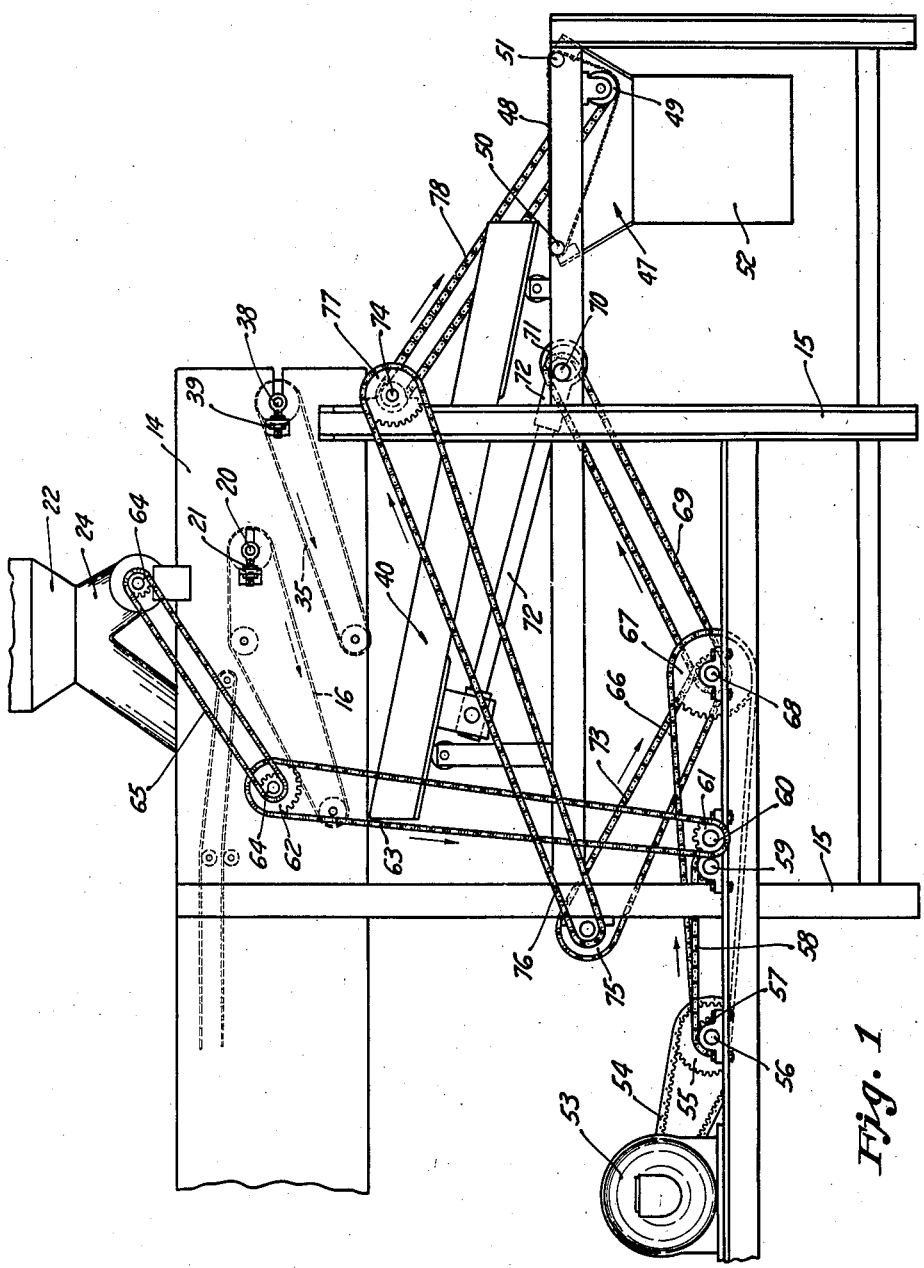
Fig. 1 is a side elevation of a machine embodying this invention.

A motor 53 is mounted on the machine frame and is in driving engagement with a chain 54 which drives a chain type of gear 55 which is secured to a shaft 56. A sprocket 57, also secured to shaft 56, drivingly engages sprocket chain 58, which also engages a sprocket carried by shaft 59. The shaft 59 drives a shaft 60 through a pair of gears, not shown. On the shaft 60, sprocket 61 drives sprocket 62 through chain 63, the sprocket 62 being located on the shaft of one of the nut distributors. Sprockets 64, located on each of the nut distributor shafts, are in driving engagement through a chain 65. As seen in Fig. 1, since the motor turns clockwise, the nut distributors turn counterclockwise, there being one pair of gears interposed. The screws employed in the distributors are therefore left-handed in order to draw the nuts.

A second chain 66 is driven by a sprocket (not shown) which is carried by the shaft 56. This chain drivingly engages sprocket 67 secured to shaft 68. A pair of driving sprockets are secured to the shaft 68, with one of which chain 69 engages, which in turn drivingly engages a sprocket secured to the shaft 70. An eccentric 71 secured to shaft 70 engages in a bearing in one end of pitman 72, the other end of which is pivoted to the under side of the table 40. A chain 73 engages the second sprocket on shaft 68 and drives the shaft 74 through sprocket 75, chain 76, and sprocket 77 secured to shaft 74. The shaft 74 crosses to the other side of the machine and is provided at its other end with a pair of sprockets, with one of which chain 78 engages. This chain 78 also engages a sprocket on the shaft of roller 49. A chain 79 engages the other sprocket on shaft 74 and is so arranged that opposite sides of the chain engage a pair of sprockets 80 arranged one on each of shafts 20 and 38. As shown, the sprocket on shaft 20 engages the inside and that on shaft 38 the outside of the chain 79. An idle sprocket 81 holds the chain 79 in engagement with the sprocket on shaft 38.

The operation of the above described machine is as follows:

The motor 53 is started, thereby driving the nut distributors through the chains 54, 58, 63, and 65, also driving the belts 16 and 35 through the chains 54, 66, 73, 76, and 79, driving the table through the chains 54, 66, and 69, and driving the sifter belt through the chains 54, 66, 73, 76, and 78. The enrobber is started into operation so as to deliver plastic coated centers serially on the conveyor belt 7, as shown at A.

The nut distributor 25 places a bed of nuts on the belt 16 which travels continuously. As shown at B, a coated center drops off of the enrobber belt onto the belt 16. The centers are preferably placed upon belt 7 with the length of the centers longitudinally of the belt. The forward end of the center will then free itself from belt 7 and be carried along by the belt 16 before the rearward end of the center is freed, whereby the center is deposited upon the bed of nuts, the same side up and same end to as when in position A upon belt 7.

The belt 16 carries the center along to position C where a layer of nuts is dropped on top of the center, many pieces of nut meat sticking to the plastic on top of the center at this point. From position C, belt 16 carries the center to position D where the belt is deflected downwardly. When the plastic material is hot so that the centers are somewhat soft, the centers will bend and follow the deflection of the belt. The nuts will drop readily from the belt 16 onto the belt 35 while the center will be held back somewhat by its length. Therefore, at the time the center drops there will already be a bed of nuts on belt 35 for it to fall upon. The center, as shown at D, will drop endwise upon belt 35, but due to the motion of the upper run of belt 35 in the opposite direction from the upper run of belt 16, the lower end of the center is moved to the left, as seen in Fig. 2. The center then drops from belt 35, together with the nuts, onto the shaping table 40 which is reciprocated. The movement of the table, together with the action of the obstructions 46 thereon, presses the nuts into the plastic and insures an even coating of nuts entirely around the center. Also, the shaping table tends to restore proper shape to centers which have been out of shape in transferring between the belts and in delivery from the last belt.

From the table 40, the nut-rolled centers are deposited upon the sifting screen 48 when the excess nuts are separated from the centers. The separated nuts may be conveyed by any suitable means from hopper 52 to hopper 22 for re-use. Rolled and shaped centers discharged from screen 48 are then in condition for further treatment in the preparation of the finished product or they may be sold as such if a bar with exposed nuts is desired.

Having now described my invention, I claim:

1. A machine for nut rolling and shaping of candy bars, comprising a driven endless belt, means for depositing a bed of nuts on the belt, means for depositing candy centers coated with an edible plastic upon the bed of nuts, means for depositing a layer of nuts on the centers positioned on the bed of nuts, a reciprocating shaping table arranged to receive from the belt the nuts and the centers with nuts adhering to the plastic, and obstructing means on the table in the path of a center moving down the table to turn the center over.

2. A nut rolling and shaping machine, comprising means to coat a candy center which is covered with an edible plastic with nuts, with the nuts loosely adhering to the plastic, a reciprocating shaping table, means to drop such centers from said coating means upon said table, said table being inclined and reciprocating in the direction of the extent of the top of the table, and having obstructing means extending transversely of the inclination of the table to turn over bars moving down said table, whereby the loosely adhering nuts are pressed into the plastic and the shape of the bars is corrected.

3. A machine for nut rolling and shaping of candy bars, comprising, in combination, an endless conveyor belt, means for continuously depositing a bed of nuts on the upper run of said belt, means for depositing a candy center, from an enrobber upon said bed of nuts, means for continuously depositing a layer of nuts upon said bed and said centers, a second endless conveyor belt located below the terminus of the upper run of the first belt with the upper run of the second belt moving in the opposite direction to the direction of movement of the upper run of the first belt, and an inclined reciprocating shaping table located below the terminus of the upper run of the second belt to receive centers and nuts from said second belt, said table having obstructing means upon its surface to turn centers over as they move down the surface.

4. In a machine for coating pieces of candy with nut meats or other loose materials, an upwardly traveling inclined feed belt, the lower portion of which is disposed at an angle, and the upper portion of which is at a lesser angle to the horizontal, means for discharging said materials on said lower portion of the belt, means for delivering the sticky pieces of candy to said upper portion of the belt, means for also positively feeding and discharging said materials on the tops of the pieces of candy riding on said upper portion of the belt, and means having movement opposite to that of said belt for receiving from the latter the partially coated pieces of candy.

5. A machine for mixing materials to produce separate pieces of confectionery, comprising an upper belt conveyor on which materials including separate pieces of candy are carried forwardly and upwardly, the belt being positioned and driven for that purpose, and a lower belt positioned and driven to receive said materials from the upper belt and carry them backward and downward under the upper belt, so that the materials are discharged from the lower end of the lower belt, there being an endwise reciprocating inclined conveyor for receiving materials from the lower end of said lower belt, so that materials on the reciprocating conveyor travel in the opposite direction from what they do on said lower belt.

6. A machine for mixing materials to produce separate pieces of confectionery, comprising an upper belt on which materials, including separate pieces of candy, are carried forwardly and upwardly, the belt being positioned and driven for that purpose, means for delivering materials to the belt a short distance forward of its lower end, means for delivering materials to the belt a distance back from its upper end, and a lower belt positioned and driven to receive said materials from the upper belt and carry them backward and downward under the upper belt, so that the materials are discharged from the lower end of the lower belt back of its forward end, such structure having means to deliver materials downward to the upper belt at an intermediate portion thereof.

7. A machine for mixing materials to produce separate pieces of confectionery, comprising an upper belt on which materials, including separate pieces of candy, are carried forwardly and upwardly, the belt being positioned and driven for that purpose, means for delivering materials to the belt a short distance forward of its lower end, a lower belt positioned and driven to receive said materials from the upper belt and carry them backward and downward under the upper belt, so that the materials are discharged from the lower end of the lower belt back of its forward end, a belt for delivering sticky pieces of material to an intermediate portion of the upper belt, and a transverse conveyor for spreading materials downward on said pieces while the latter are moving with the belt.

8. In a machine for coating pieces of candy with nut meats or other loose materials, an upwardly travelling inclined feed belt, the lower portion of which is disposed at an angle, and the upper portion of which is at a lesser angle to the horizontal, means for discharging said materials on said lower portion of the belt, means for delivering the sticky pieces of candy to said upper portion of the belt, means for also positively feeding and discharging said materials on the tops of the pieces of candy riding on said upper portion of the belt, and means having movement opposite to that of said belt for receiving from the latter the partially coated pieces of candy, said last mentioned means comprising a second feed belt disposed below said first mentioned feed belt, with the two belts travelling in opposite directions, so that the confectionery travels above in one direction on the first belt and then below in the opposite direction on the second belt, and with said second belt projecting beyond the discharge end of said upper belt, so that the second belt receives the pieces of candy and the excess or surplus portions of said materials, and whereby the candy and the materials travel downhill on the lower belt.

9. A machine for mixing materials to produce separate pieces of confectionery, comprising an upper belt conveyor on which materials, including separate pieces of candy, are carried forwardly and upwardly, the belt being positioned and driven for that purpose, means for delivering materials to the belt a short distance forward of its lower end, means for delivering materials a distance back from its upper end, and a lower belt positioned and driven to receive said materials from the upper belt and carry them backward and downward under the upper belt, so that the materials are discharged from the lower end of the lower belt.

10. A machine for mixing materials to produce separate pieces of confectionery, comprising an upper belt conveyor on which materials, including separate pieces of candy, are carried forwardly and upwardly, the belt being positioned and driven for that purpose, means for delivering materials to the belt a short distance forward of its lower end, means for delivering materials a distance back from its upper end, and a lower belt positioned and driven to receive said materials from the upper belt and carry them backward and downward under the upper belt, so that the materials are discharged from the lower end of the lower belt, the upper end of the lower belt extending beyond the upper end of the upper belt, to receive materials from the latter, and the lower end of the upper belt extending beyond the lower end of the lower belt.

11. A machine for mixing materials to produce separate pieces of confectionery, comprising an upper belt conveyor on which materials, including separate pieces of candy, are carried forwardly and upwardly, the belt being positioned and driven for that purpose, means for delivering materials to the belt a short distance forward of its lower end, means for delivering materials a distance back from its upper end, and a lower belt positioned and driven to receive said materials from the upper belt and carry them backward and downward under the upper belt, so that the materials are discharged from the lower end of the lower belt, said upper belt being supported with its candy carrying portion arranged to travel upwardly at an angle and then forwardly at a different angle.

12. A machine for mixing materials to produce separate pieces of confectionery, comprising an upper belt conveyor on which materials, including separate pieces of candy, are carried forwardly and upwardly, the belt being positioned and driven for that purpose, and a lower belt positioned and driven to receive said materials from the upper belt and carry them backward and downward under the upper belt, so that the materials are discharged from the lower end of the lower belt, comprising means to deliver materials downward to the upper and lower ends of the upper belt and also to an intermediate portion thereof.

13. A machine for mixing materials to produce separate pieces of confectionery, comprising an upper belt conveyor on which materials, including separate pieces of candy, are carried forwardly and upwardly, the belt being positioned and driven for that purpose, and an inclined lower belt positioned and driven to receive said materials adjacent its upper end from the upper belt, so that the materials are discharged from the lower end of the lower belt, there being an endwise reciprocating inclined conveyor for receiving materials from the lower end of said lower belt, so that materials on the reciprocating conveyor travel in the opposite direction from what they do on said lower belt.

14. A machine for mixing materials to produce separate pieces of confectionery, comprising an upper belt conveyor on which materials, including separate pieces of candy, are carried forwardly and upwardly, the belt being positioned and driven for that purpose, and a lower belt positioned and driven to receive said materials from the upper belt and carry them backward and downward under the upper belt, so that the materials are discharged from the lower end of the lower belt, there being a belt for delivering sticky pieces of material to an intermediate portion of the upper belt, and a transverse conveyor for spreading materials downward on said pieces while the latter are moving with the upper belt.

15. A machine for coating sticky pieces of confection, comprising a conveyor belt arranged longitudinal of the machine, means for operating said belt to make it feed toward the forward end of the machine, a transverse feeder for feeding coating materials to the rear end of the belt, a conveyor for delivering sticky pieces of confection to an intermediate portion of the belt, upon said materials, a transverse feeder adjacent the forward end of the belt for feeding coating materials upon said pieces of confection, and a second conveyor belt below said first mentioned conveyor belt, this second conveyor belt being operated in the opposite direction and extending beyond the forward end of the first mentioned conveyor belt and stopping short of the rear end of the first mentioned conveyor belt so that the pieces of confection and the surplus coating materials are delivered to this second conveyor belt at a point beyond the second mentioned transverse feeder.

CHARLES E. BOOKIDIS.